(12) United States Patent
Woodward et al.

(10) Patent No.: US 6,434,159 B1
(45) Date of Patent: Aug. 13, 2002

(54) TRANSACTION SYSTEM AND METHOD THEREFOR

(75) Inventors: Ernest Earl Woodward, Chandler; Ronald William Borgstahl, Phoenix; Jeffrey Martin Harris, Chandler, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/443,855

(22) Filed: Nov. 19, 1999

Related U.S. Application Data

(63) Continuation-in-part of application No. 09/104,631, filed on Jun. 25, 1998, which is a continuation-in-part of application No. 08/729,207, filed on Oct. 15, 1996, now Pat. No. 6,069,896.

(51) Int. Cl.[7] .................................................. H04J 3/02
(52) U.S. Cl. ........................ 370/401; 370/259; 370/310; 379/102.02; 455/414
(58) Field of Search ................................ 370/259, 310, 370/313, 315, 401, 402; 379/102.01, 102.02, 106.01; 455/414, 418, 411, 406, 407, 408; 235/472, 462, 493, 383; 340/825.35, 928

(56) References Cited

U.S. PATENT DOCUMENTS

| | | | | |
|---|---|---|---|---|
| 5,596,501 A | * | 1/1997 | Comer et al. | 340/825.35 |
| 5,602,919 A | * | 2/1997 | Hurta et al. | 340/928 |
| 5,640,002 A | * | 6/1997 | Ruppert et al. | 235/472 |
| 5,710,540 A |   | 1/1998 | Clement et al. | 340/572 |
| 6,048,271 A | * | 4/2000 | Barcelou | 463/48 |
| 6,069,896 A | * | 5/2000 | Borgstahl et al. | 370/338 |
| 6,128,661 A | * | 10/2000 | Flanagin et al. | 709/227 |
| 6,131,814 A | * | 10/2000 | Swartz | 235/472.01 |
| 6,144,848 A | * | 11/2000 | Walsh et al. | 379/102.01 |

* cited by examiner

*Primary Examiner*—Douglas Olms
*Assistant Examiner*—Shick Hom
(74) *Attorney, Agent, or Firm*—Hisashi D. Watanabe

(57) ABSTRACT

A peer device (132) is arranged and programmed for handling a transaction at a point of sale provided by a merchant, and a personal presence identifier (122) is carried by a user and coupled to the peer device by a short-range two-way wireless link. The peer device and the personal presence identifier are arranged and programmed to establish a two-way personal area network (22) with one another when the personal presence identifier is within wireless transmission range of the peer device. The personal presence identifier and the peer device are also arranged and programmed to exchange needs specifications (70) and capability specifications (72) with one another after establishing the two-way personal area network.

19 Claims, 9 Drawing Sheets

APPLIANCE CIRCUITS — 48
PDA
TELEVISION
RADIO
CD PLAYER
TAPE PLAYER
COPIER
FACSIMILE
TELEPHONE
CELL PHONE
CORDLESS PHONE
PAGER
WATCH
COMPUTER
POS TERMINAL
AUTOMATED TELLER
⋮

*FIG. 3*

RELAY INTERFACE — 44
MODEM – PSTN
NETWORK – LAN
NETWORK – WAN
MODEM – SATELLITE
CELL PHONE – PSTN
TELEPHONE – PSTN
⋮

*FIG. 4*

| I/O | | 46 |
|---|---|---|
| INPUT DEVICES | OUTPUT DEVICES | |
| KEYBOARD<br>POINTING DEVICE<br>OPTICAL SCANNER<br>MICROPHONE<br>⋮ | PRINTER<br>MODEM<br>SPEAKER<br>⋮ | |

*FIG. 5*

| NEED/CAPABILITY MESSAGE | | | | | 64 |
|---|---|---|---|---|---|
| PEER ID | AUTHORIZATION KEY | NEED(S) SPECIFICATION | CAPABILITIES SPECIFICATION | ... | |
| 66 | 68 | 70 | 72 | | |

*FIG. 7*

| NEED TABLE | | ─ 74 |
|---|---|---|
| CODE | MEANING | |
| — | APPLIANCE PERSONALIZATION (E.G., OWNERS NAME) | |
| — | HARD COPY (E.G., PRINT) | |
| — | VISUAL IMAGE (E.G., DISPLAY) | |
| — | AUDIO (E.G., HIGH FIDELITY) | |
| — | GATEWAY (E.G., INTERNET) | |
| — | FINANCIAL TRANSACTIONS (E.G., POS, POINT OF SALE) | |
| — | LOCK/UNLOCK (E.G., SECURITY ENABLE/DISABLE) | |
| ⋮ | ⋮ | |

*FIG. 8*

| CAPABILITY TABLE | | ─ 76 |
|---|---|---|
| CODE | MEANING | |
| — | APPLIANCE PERSONALIZATION (E.G., OWNERS NAME) | |
| — | HARD COPY (E.G., PRINT) | |
| — | MULTIMEDIA (E.G., REAL TIME VIDEO) | |
| — | VOICE (E.G., SPEECH) | |
| — | AUDIO (E.G., HIGH FIDELITY) | |
| — | GATEWAY (E.G., INTERNET) | |
| — | FINANCIAL TRANSACTIONS (E.G., POS, POINT OF SALE) | |
| — | LOCK/UNLOCK (E.G., SECURITY ENABLE/DISABLE) | |
| ⋮ | ⋮ | |

*FIG. 9*

TRANSACTION SYSTEM AND METHOD THEREFOR

RELATED APPLICATIONS

This application is a continuation-in-part of U.S. application Ser. No. 09/104,631 Jun. 25, 2998, by Borgstahl et al., entitled "CAPAABILITY ADDRESSABLE NETWORK AND METHOD THEREFOR," which is a continuation-in-part of U.S. application Ser. No. 08/729,207 filed Oct. 15, 1997, now U.S. Pat. No. 6,069,896 by Borgstahl et al., entitled "CAPABILITY ADDRESSABLE NETWORK AND METHOD THEREFOR." U.S. application Ser. No. 09/104,631 is hereby incorporated herein by reference.

TECHNICAL FIELD OF THE INVENTION

The present invention relates generally to data communication networks. More specifically, the present invention relates to a transaction system and method therefor.

BACKGROUND OF THE INVENTION

In a typical day many people come into contact with a massive number of electronically controlled devices. Such devices range from automobiles and appliances, to home and office equipment, and to telephones and televisions to name but a few. Many of these devices are required to move from time to time, and many of these devices are even portable. These devices provide a vast and diverse assortment of services for the people coming into contact with them. However, they suffer from a common problem related to user input and output (I/O).

User I/O refers to components and processes used to communicate user-supplied data to an electronic device and to annunciate data from an electronic device so the data may be perceived by a user. Although electronic devices provide a vast and diverse assortment of services, they tend to have redundant I/O. In other words, many such devices have displays, speakers, and the like at which data may be annunciated and have buttons, switches, keypads, and other controls at which user-supplied data may be communicated to the devices. In order to keep costs low and size small, user I/O capabilities often suffer. As a result, many electronic devices encountered in everyday life, and particularly many portable devices, are cumbersome and tedious to use because communicating data from a user to the devices is difficult and because provisions are unavailable for clearly annunciating data for a user's benefit.

In theory, this user I/O problem could be ameliorated by better integrating electronic devices to ease data communications therebetween. For example, a portable telephone could receive a facsimile (fax), but typically has no capability to print the fax and no capability to communicate with a printer which may be able to print the fax. Likewise, a pager may receive a call-back phone number, but typical pagers have no capability to transfer the call-back number to a telephone from which the call-back can be made. User involvement is required to address these and many other data transfer issues. While many conventional data communication or computer network architectures are known, the conventional architectures are unsuitable for the task of integrating a plurality of electronic devices which collectively provide a vast and diverse assortment of services.

Conventional computer networks require excessively complicated setup or activation procedures. Such setup and activation procedures make the jobs of forming a connection to a new network node and making changes in connectibility permission cumbersome at best. Setup and activation procedures are instituted, at least in part, to maintain control of security and to define network addresses. Typically, a system administration level of security clearance is required before access is granted to network tables that define the network addresses. Thus, in conventional networks, many network users lack sufficient security clearance to activate and obtain addresses of network nodes with which they may wish to connect on their own.

Once setup is performed, either directly by a user or by a system administrator, connections are formed when an initiating node presents the network with the address of a network node to which a connection is desired. The setup or activation requirements of conventional networks force nodes to know or obtain a prior knowledge of node addresses with which they wish to connect prior to making the connection. Excessive user attention is involved in making the connection through setup procedures and during the instant of connection to obtain addresses. This level of user involvement leads to an impractical network implementation between the everyday electronic devices with which people come into contact.

Further, conventional computer networks tend to be infrastructure intensive. The infrastructure includes wiring, servers, base stations, hubs, and other devices which are dedicated to network use but have no substantial non-network use to the computers they interconnect. The use of extensive network components is undesirable for a network implementation between everyday electronic devices because an immense expense would be involved to support such an infrastructure and because it impedes portability and movability of nodes.

The use of wiring to interconnect network nodes is a particularly offensive impediment to the use of conventional networks because wiring between diverse nodes is not suitable when some of the nodes are portable. Wireless communication links could theoretically solve the wiring problem. And, conventional wireless data communication networks are known. However, the conventional wireless networks do little more than replace wire lines with wireless communication links. An excessive amount of infrastructure and excessive user involvement in setup procedures are still required.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows a list of appliance circuits which may be included in the hardware illustrated in FIG. 2;

FIG. 4 shows a list of relay interfaces which may be included in the hardware illustrated in FIG. 2;

FIG. 5 shows a list of I/O devices which may be included in the hardware illustrated FIG. 2;

FIG. 7 shows a data format diagram of an exemplary need/capability message communicated from a peer to initiate a setup connection;

FIG. 8 shows an exemplary need table which identifies possible network service needs which might occur at a peer;

FIG. 9 shows an exemplary capability table which identifies possible network capabilities which may be provided by a peer;

DETAILED DESCRIPTION OF THE DRAWINGS

Figure 1:
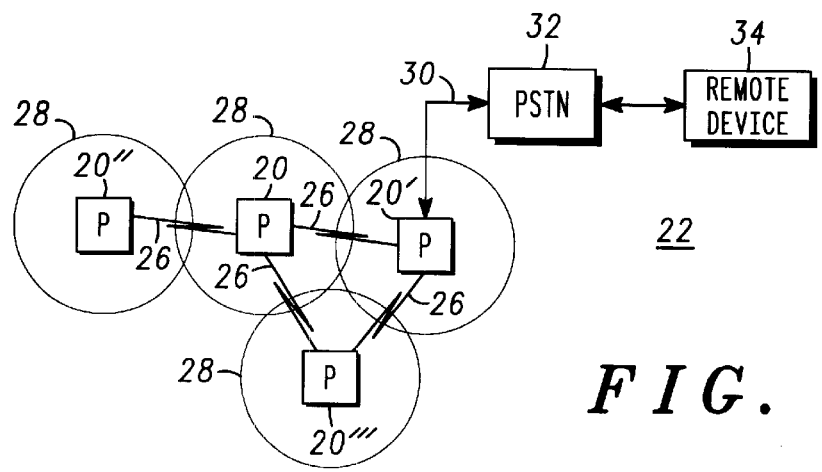
FIG. 1 shows a layout diagram depicting relationships between various peers in a wireless peer-to-peer data communication network configured in accordance with the teaching of the present invention.

FIG. 1 shows a layout diagram depicting relationships between various peers (P) 20 in a capability addressable, wireless, peer-to-peer data communication network 22 configured in accordance with the teaching of the present invention. While FIG. 1 shows only a few peers 20, virtually any computer or microprocessor controlled electronic device throughout the world may serve as a peer 20. Accordingly, network 22 supports an unfathomable number of possible connections between peers 20.

As used herein, the term "peer-to-peer" is defined to mean having at least common portions of communications protocol and/or capability and does not refer to equivalence of physical size, functional capability, data processing capacity or transmitter/receiver range or power. Each peer or communication node 20 of communications network 22 may establish a personal area network. For example, a first and a second of nodes 20 first find or determine that each other is a compatible node. Then, as a result of self-initiated processes, first and second nodes 20 form the personal network. First and second nodes 20 must detect that they are in a particular proximity to one another and if so a communication link is established. This link may be accomplished by known RF techniques. When a link is established, first and second nodes 20 exchange what their needs and capabilities are. When needs and capabilities are not able to be satisfied or matched, one of first and second nodes 20 may alternately route the communications link to a third communication node 20. Put another way, a communications platform that includes at least two nodes having overlapping communications regions could also include means for exchanging needs and capabilities information between the at least two nodes for forming a communication network.

Network 22 is desirably configured in a peer-to-peer architecture so that only a trivial amount of network-specific components are used. In the preferred embodiments, each peer 20 can initiate a connection with other peers 20 without servers being required to manage the connections. Moreover, peers 20 can freely move about without affecting the network structure or requiring the performance of reconfiguration, setup, or activation procedures.

Free movement of peers 20 is further supported by using wireless communication links 26 as a physical transport layer in network 22. In the preferred embodiments, wireless communication links 26 are RF links operating in the higher regions of the microwave band so that small, lightweight, inexpensive, omni-directional antennas may be used. However, other RF frequencies, optical links, and other wireless communication links known to those skilled in the art may be used as well. The specific protocols used in implementing wireless communication links 26 are not important to the present invention. Various TDMA, FDMA, and/or CDMA techniques known to those skilled in the art may be employed. However, all peers 20 in network 22 desirably have the ability to communicate using the protocols, regardless of the capabilities and needs of the peers 20.

FIG. 1 depicts a detection zone 28 surrounding each peer 20. In the preferred embodiments, wireless communication links 26 for the vast majority of peers 20 are operated at a sufficiently low power so that a wireless communication range for a given peer 20 is limited to being less than 50 meters, and more preferably to being less than about 5 meters for the typical peer 20. The use of this degree of low power transmissions limits interference between independent connections which may share the wireless spectrum at different locations. Moreover, the use of this degree of low power transmissions is compatible with configuring a substantial portion of peers 20 as portable devices. Those skilled in the art will appreciate that hand-portable electronic devices share the characteristics of being physically small, lightweight, and including a self-contained power source such as a battery. Extremely low power transmissions do not severely deplete the reserves of small batteries typically used in portable devices.

While a peer 20 may potentially connect through network 22 with a vast multitude of peers 20, the use of low power wireless communication links 26 limits the number of potential connections at any given instant in time to those peers 20 which are physically proximate to one another. In other words, only when a first peer 20 resides in the detection zone 28 of a second peer 20 and that second peer 20 resides in the detection zone 28 of the first peer 20 can a connection through network 22 occur.

Rather than specifying a network unique address to initiate a connection, network 22 uses physical proximity along with a needs and capabilities evaluation (discussed below) to target a peer 20 with which a connection is desired. By not specifying a network unique address to initiate a connection, user involvement in making connections is reduced and network addressing becomes dynamically configurable. Such an addressing scheme is useful in exchanging data between devices a user carries and comes into contact with on a daily basis.

Not all peers 20 are required to be portable devices. FIG. 1 shows a wireline communication link 30 connecting a peer 20' to a public switched telecommunication network (PSTN) 32. Through PSTN 32, peer 20' may communicate with a vast assortment of remote devices 34, of which FIG. 1 shows only one. Peer 20' may be powered from a public power network (not shown) so that minimizing power consumption is not a significant design issue. While FIG. 1 depicts only PSTN 32 linking a peer 20 to a remote device 34, other local area network (LAN), wide area network (WAN) or communication links known to those skilled in the art may connect a peer 20 to remote devices 34. Remote devices 34 may or may not themselves be peers 20. While network 22 uses proximity as a factor in targeting peers 20 to which connections are formed, the use of routing, gateway or relaying peers 20' permits connections to be extended over great distances through the use of other networks.

Figure 2:
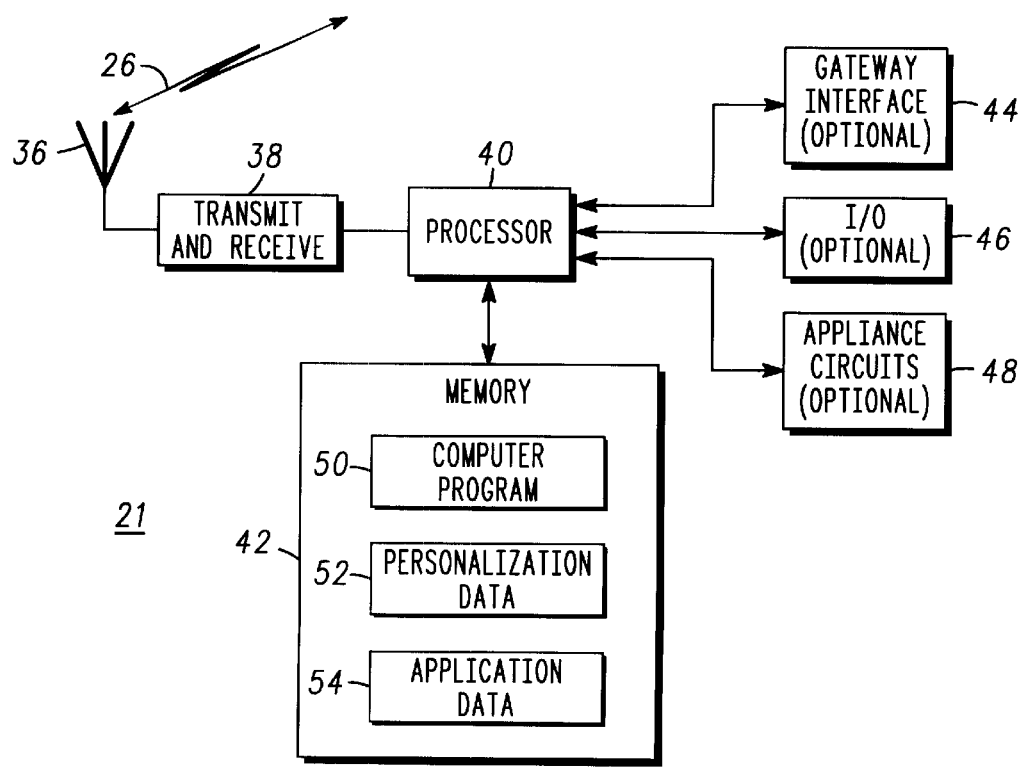
FIG. 2 shows a block diagram of hardware included in a peer.

FIG. 2 shows a block diagram of hardware included in a peer 20. Peer 20 includes an antenna 36 configured to support wireless communication link 26. Antenna 36 couples to a transmit and receive section 38. Transmit and receive section 38 is compatible with the protocols peers 20 use to communicate with one another. Transmit and receive section 38 couples to a processor 40. Processor 40 couples to a memory 42, an optional relay interface 44, an optional I/O section 46, and optional appliance circuits 48.

Processor 40 executes computer programs 50 which are stored in memory 42. Computer programs 50 define processes performed by processor 40 and peer 20. Memory 42 additionally stores personalization data 52 and application data 54. Personalization data 52 characterize a user or owner of peer 20 and may change from user to user. ID codes, passwords, and PINs are examples of personalization data as are radio or TV channel presets, language preferences, and speed dial telephone numbers. Application data 54 are provided by performing peer applications, and may change from moment to moment. A facsimile, a telephone number received over a pager, data scanned in using a bar code reader, and a sound snippet received from a microphone or other audio source represent examples of application data.

FIG. 3 shows a non-exhaustive list of examples of appliance circuits 48 which may be included in a peer 20. Referring to FIGS. 2 and 3, appliance circuits 48 may be configured as any type of a wide variety of everyday, commonly encountered electronically controlled devices. Thus, a peer 20 may, in addition to being a peer 20, be a personal digital assistant (PDA), smartcard, television, radio, CD player, tape player, copier, facsimile machine, telephone, cellular telephone, cordless telephone, pager, watch, computer, point of sale (POS) terminal, automated teller, or other electronic device.

FIG. 4 shows a non-exhaustive list of relay interfaces 44 which may be included in a peer 20. Referring to FIGS. 2 and 4, relay circuits 44 may be configured as any of a wide variety of relay, routing, or gateway devices known to those skilled in the art. For example, a peer 20 may, in addition to being a peer 20, be a modem which couples peer 20 to PSTN 32 (see FIG. 1). Other relay interfaces 44 may couple a peer 20 to LANs or WANs. Still other relay interfaces 44 may couple a peer 20 modem to a satellite, a peer 20 cell phone to PSTN 32, a plain old telephone (POT) peer 20 to PSTN 32, or a peer 20 to another peer 20.

FIG. 5 shows a non-exhaustive list of I/O devices 46 which may be included in a peer 20. Referring to FIGS. 2 and 5, I/O devices 46 may be classified into input devices and output devices. Input devices may include keyboards, pointing devices, optical scanners, microphones, and other well known input devices. Output devices may include printers, monitors, speakers, and other well known output devices. Thus, in addition to being a peer 20, a peer 20 may be an I/O device 46.

Those skilled in the art will appreciate that relay interface section 44, I/O section 46 and appliance circuits 48 are not mutually exclusive categories. For example, many devices fall into multiple categories. For example, a computer considered as an appliance may include both an I/O section and a relay interface. Likewise, a relay interface may serve an I/O role.

Figure 6:
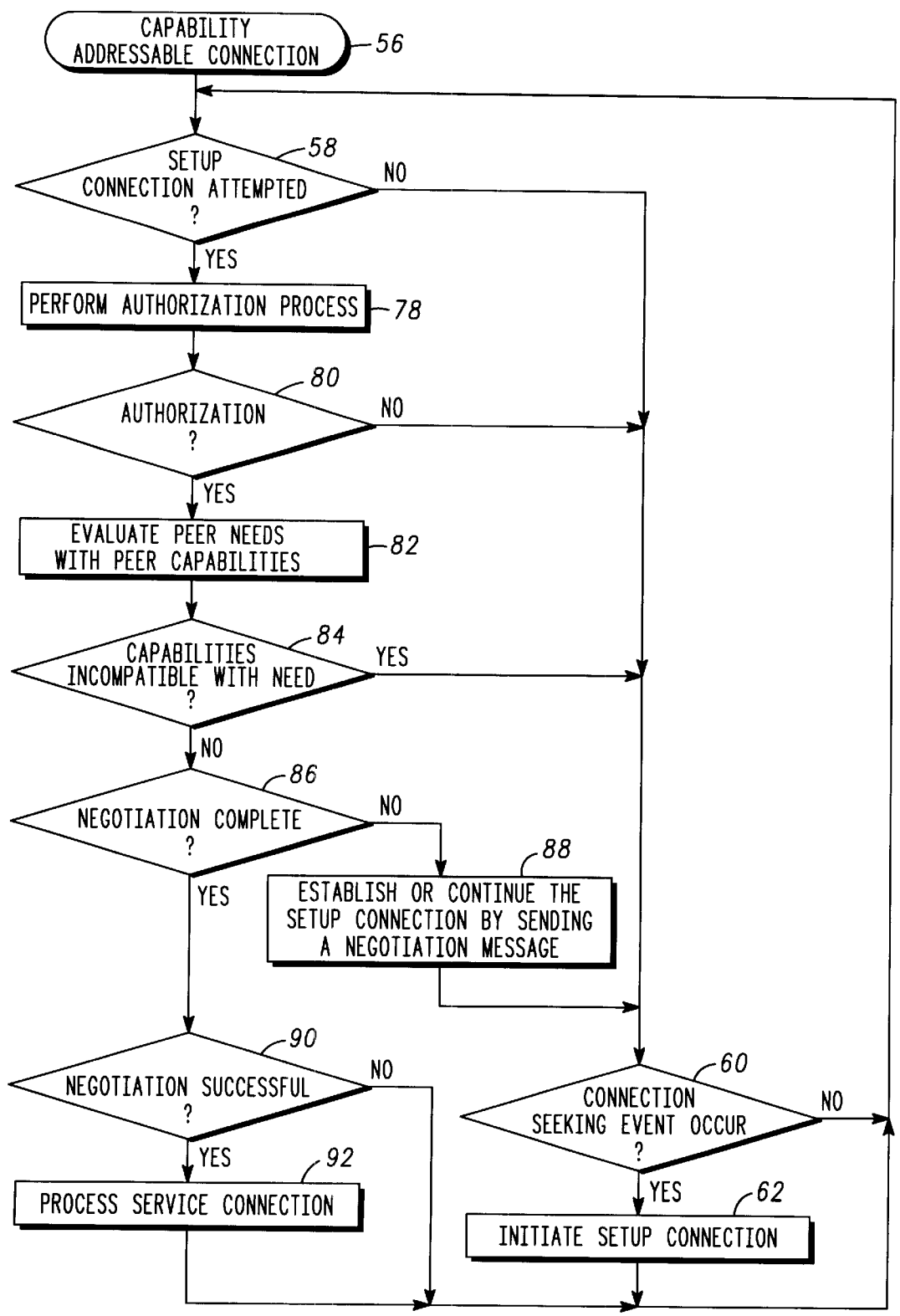
FIG. 6 shows a flow chart of tasks included in a capability addressable connection process performed by a peer.

FIG. 6 shows a flow chart of tasks included in a capability addressable connection process 56 performed by a peer 20. Process 56 is defined by a computer program 50 stored in memory 42 of peer 20 (see FIG. 2) in a manner well known to those skilled in the art. In the preferred embodiments, all peers 20 perform a process similar to process 56.

Process 56 includes a query task 58 during which peer 20 determines whether a setup connection is being attempted. Generally, task 58 allows a first peer 20 to determine whether a second peer 20 is physically proximate to the first peer 20. Task 58 causes transmit and receive section 38 (see FIG. 2) to monitor wireless communication link 26 (see FIG. 1) to determine whether a signal compatible with a protocol being used by network 22 (see FIG. 1) can be received. Due to the above-described low transmission power levels used by peers 20, when a signal is detected, the peer 20 sending the signal is located near the receiving peer 20.

When task 58 fails to determine that a setup connection is being attempted, a query task 60 determines whether a connection-seeking event has occurred. A connection-seeking event causes a peer 20 to seek out a connection with another peer 20. Connection-seeking events can be triggered using a periodic schedule. For example, connections may be sought out every few seconds. In this example, the schedule may call for more frequent periodic connection attempts from peers 20 which are powered from a public power network and less frequent connection attempts from peers 20 which are battery powered. Connection-seeking events can also be triggered upon the expiration of a timer or upon the receipt of other external information. The other external information can include information obtained through appliance circuits 48, relay interface 44, or I/O section 46 (see FIG. 2) including user input.

If task 60 fails to determine that a connection-seeking event has occurred, program control loops back to task 58. If task 60 determines that a connection-seeking event has occurred, process 56 performs a task 62. Task 62 initiates an unsolicited setup connection. The setup connection is not addressed to any particular peer 20 of network 22. Rather, it is broadcast from the peer 20 making the attempt and will be received by all peers 20 within the detection zone 28 (see FIG. 1) of the broadcasting peer 20. As discussed below, the broadcast signal need not be answered by another peer 20 even when another peer 20 is in detection zone 28. At this point, the broadcasting peer 20 does not know if any other peer 20 can receive the broadcast signal, and the broadcasting peer 20 does not know any particular needs or capabilities of other peers 20 should other peers 20 be sufficiently proximate so that a connection may be formed.

Task 62 initiates a setup connection by broadcasting a need/capability message 64, an exemplary format for which is depicted in FIG. 7. Referring to FIG. 7, message 64 includes an ID 66 for the peer 20 broadcasting message 64, an authorization key 68, a need specification 70, a capability specification 72, and can include other data elements. ID 66 is desirably sufficiently unique within the domain of network 22 so that it may be used in an addressed service connection, should the setup connection prove successful. Authorization key 68 includes one or more data codes which may be used by a receiving peer 20 in performing an authorization process. Needs specification 70 is a list of network needs currently experienced by the broadcasting peer 20. Capability specification 72 is a list of network capabilities which the broadcasting peer 20 may provide to other peers 20 of network 22.

Needs specification 70 may be determined by consulting a need table 74, an exemplary and non-exhaustive block diagram of which is depicted in FIG. 8. As illustrated in FIG. 8, data codes may be associated with a variety of network service needs which a service-requesting peer 20 may experience.

One exemplary need is that of appliance personalization. In the appliance personalization need example, a PDA might need to personalize nearby appliances. To satisfy this need, personalization data 52 (see FIG. 2) should be programmed into certain nearby appliances without user intervention. As a result, the certain appliances will always be programmed with a particular user's personalization data whenever that user is near, without requiring action on the user's part, and regardless of prior persons who may have used the appliance.

Other exemplary needs can include that of printing application data 54 (see FIG. 2), displaying application data 54, annunciating application data 54 at a speaker, routing connectivity to the Internet or other network resources, POS transactions, passage through secure areas or toll booths, and the like.

Capability specification 72 may be determined by consulting a capability table 76, an exemplary and non-exhaustive block diagram of which is depicted in FIG. 9. As illustrated in FIG. 9, data codes may be associated with a variety of network capabilities provided by a service-providing peer 20. For example, a service-providing peer 20 capability can be that of appliance personalization. Thus, a peer 20 may be capable of being personalized by personalization data 52 (see FIG. 2). Other examples include capabilities of printing, displaying, annunciating over a speaker, relaying a connection through the Internet or other network, POS terminal, and unlocking a secured passageway, to name a few. In general, potential capabilities are compatible with potential needs.

Referring back to FIG. 7, need/capability message 64 includes those codes from tables 74 and 76 (see FIGS. 8–9) that currently apply. While a peer 20 may have more than one need or capability at a given instant, nothing requires a peer 20 to have multiple needs or capabilities. Moreover, nothing requires a peer 20 to have both a network need and a network capability. Message 64 serves as a need message if a network need is specified regardless of whether a network capability is specified and as a capability message if a network capability is specified regardless of whether a network need is specified.

Referring back to FIG. 6, after task 62 broadcasts message 64 (see FIG. 7), program control loops back to task 58. When task 58 eventually detects that a setup connection is being attempted by receiving a message 64, a task 78 performs an authorization process. Task 78 uses authorization key 68 (see FIG. 7) from message 64 to determine if the peer 20 attempting to setup a connection is authorized to connect to the receiving peer 20. Task 78 allows an owner of a peer 20 to restrict access to the owned peer 20 through network 22. The authorization process of task 78 may be used, for example, to restrict personalization capabilities of an appliance to a small family group. Alternatively, a peer 20 having a POS capability may perform an extensive authorization process before permitting a transaction to take place. A peer 20 having a need may also qualify the receipt of provided services depending upon the authorization process provided by task 78.

After task 78, a query task 80 determines whether the authorization process 78 authorized the attempted setup connection. If authorization is denied, program control loops back to task 60. The receiving peer 20 need not reply or otherwise acknowledge the attempted setup connection.

If authorization is accepted, a task 82 evaluates peer needs with peer capabilities. In other words, task 82 causes the message-receiving peer to compare its available capabilities (if any) to any needs listed in a received unsolicited need/ capability message 64 (see FIG. 7) and to compare its available needs (if any) to any capabilities listed in the message 64. After task 82, a query task 84 acts upon the result of the evaluation of task 82. If no internal capabilities match needs indicated in an unsolicited message 64, and if no internal needs match capabilities indicated in an unsolicited message 64, then neither peer 20 can be of service to the other. Program control loops back to task 60, and the receiving peer 20 need not reply or otherwise acknowledge the attempted setup connection.

At this point, the vast multitude of potential connections which a peer 20 may make within network 22 has been greatly reduced in scope without the use of network-unique addressing. The low power transmission scheme excludes most peers 20 in network 22 from being connectable at a current instant because most peers 20 will not be proximate one another. Of the few peers 20 which may be within each other's detection zones 28 (see FIG. 1), the scope of potential connections has been further limited through the authorization process of task 78 and needs and capabilities evaluation of task 82. Additional exclusions on the remaining potential connections are performed through a negotiation process carried on between a service-requesting peer 20 and a service-providing peer 20.

When task 84 determines that capabilities and needs appear to be compatible, a query task 86 determines whether this negotiation process is complete. If the negotiation process is not complete, a task 88 establishes or otherwise continues the setup connection in furtherance of the negotiation process by sending an addressed negotiation message (not shown) to the peer 20 whose peer ID 66 (see FIG. 7) was included in a just-received needs/capabilities message 64. The negotiation message can have a form similar to that of needs/capabilities message 64, but be specifically addressed to the other peer 20.

After task 88, program control loops back to task 60. Subsequent negotiation messages may, but need not, be received. If such subsequent negotiation messages indicate that both peers 20 to the prospective connection have completed negotiation, a query task 90 determines whether the negotiation was successful. If the negotiation was not successful, program control loops back to task 58, and no service connection will result. However, if the negotiation was successful, a process service connection procedure 92 is performed. During procedure 92, a one-to-one, addressed connection is established between peers 20 to perform network services. Upon completion of the service connection, program flow loops back to task 58.

While nothing prevents capability addressable connection process 56 from relying upon user intervention during the setup connection process, user intervention is not required. Whether user intervention is required or not should depend upon the security and other considerations connected with the nature of the peers 20 involved. For example, peers 20 involved in financial transactions can benefit upon user intervention to ensure security. However, personalization of user-owned appliances and many other connection scenarios need not rely on user intervention.

Figure 10:
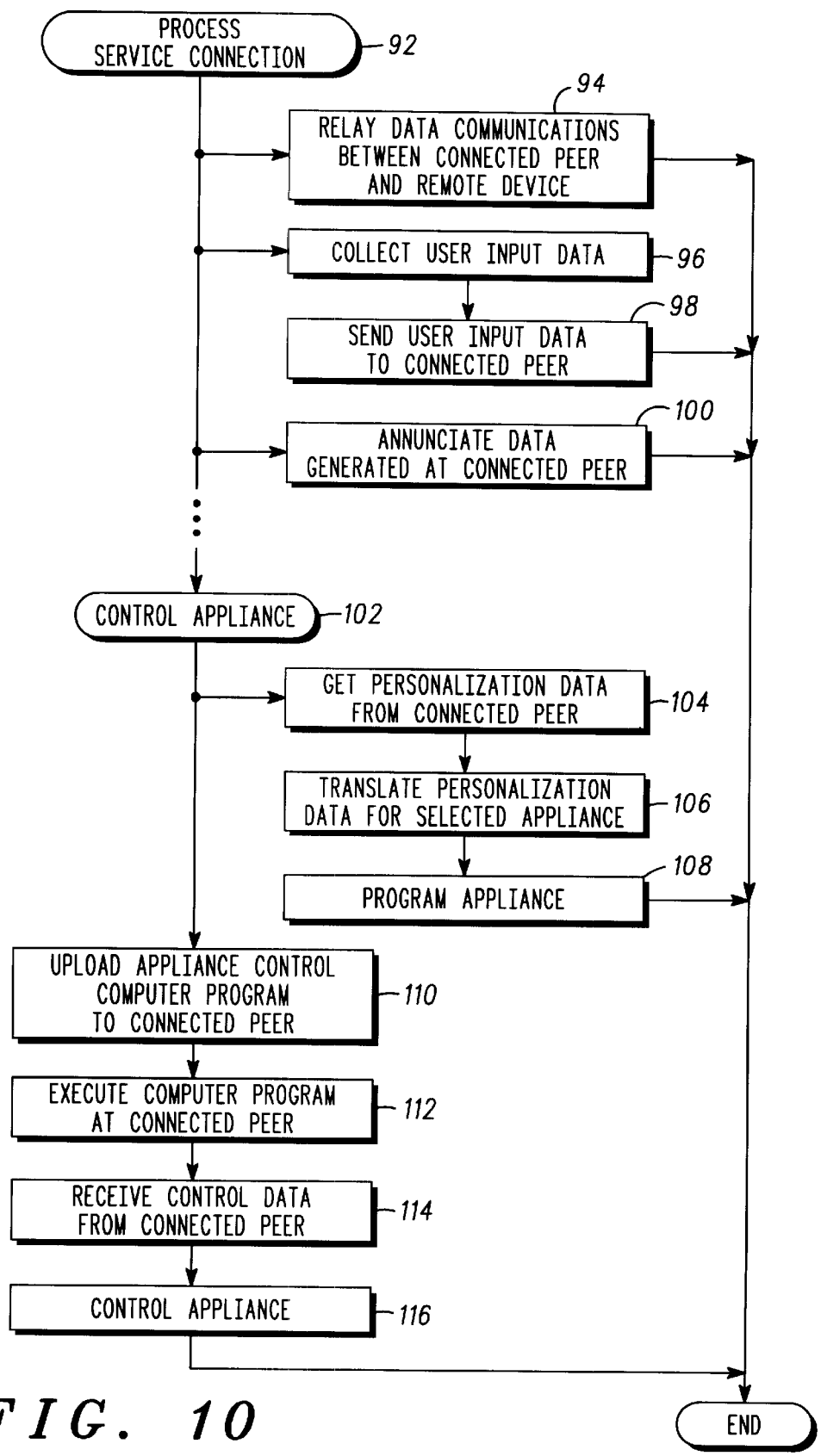
FIG. 10 shows a flow chart of a process service connection procedure performed at a peer.

FIG. 10 shows a flow chart of process service connection procedure 92. Procedure 92 illustrates a collection of tasks which can be performed at a service-providing peer 20 in support of a service connection. Not all peers 20 need to be able to perform all the tasks depicted in FIG. 10. Likewise, many peers 20 may include other tasks which suit the nature of those particular peers 20.

Procedure 92 performs a task 94 to provide a network relay, router, or gateway capability for a service-receiving peer 20 of network 22 through an established service connection. During task 94, a service-providing peer 20 relays data communications between the connected peer 20 and a remote device 34 (see FIG. 1). After task 94, program flow returns to process 56 (see FIG. 6). Task 94 may be used to extend the service connection to the Internet or other network.

Procedure 92 performs tasks 96 and 98 to provide a user input capability for a service-receiving peer 20 of network 22 through an established service connection. During task 96, the service-providing peer 20 collects user input from its I/O section 46 (see FIG. 2). During task 98, the service-providing peer 20 sends the collected user input data to the connected service-receiving peer 20. After task 98, program flow returns. Tasks 96 and 98 may be used to control or program appliances from a PDA or other device which may have enhanced user input capabilities.

Procedure 92 performs a task 100 to provide a user output capability for a service-receiving peer 20 of network 22 through an established service connection. During task 100, the service-providing peer 20 receives data generated from the service-receiving peer 20 over the service connection and annunciates the data at an output device in its I/O section 46 (see FIG. 2). The data may be annunciated in an audibly or visibly perceivable format or in any other format perceivable by human senses. After task 100, program flow returns. Task 100 may be used to annunciate data collected in a portable peer 20 at a nonportable annunciating device. Alternatively, task 100 may be used to annunciate data generated by a stationary appliance with limited I/O capability at a portable annunciating device.

Procedure 92 performs a control appliance process 102 to support the controlling of appliances. Tasks 104, 106, and 108 of process 102 are performed to program an appliance peer 20 with personalization data 52 (see FIG. 2). During task 104, a service-providing peer 20 gets personalization data 52 from the connected, service-receiving peer 20 using the service connection. Next, task 106 translates the network compatible personalization data 52 into a format suitable for the specific appliance to be programmed with personalization data 52. It should be noted that not all personalization data 52 available in a service-receiving peer 20 needs to be applicable to all appliances. Thus, task 106 can use as much of personalization data 52 as applies to the specific appliance. After task 106, task 108 causes the appliance to be programmed with the translated personalization data 52. After task 108, program flow returns.

Tasks 110, 112, 114, and 116 of process 102 are performed to allow a user to easily control an appliance. These tasks can be performed on a PDA, for example, which has a display and user input capability exceeding the user I/O capabilities typically found on appliances. In this case, an appliance is a service-receiving peer 20 while the PDA is a service-providing peer 20. During task 110, the service-receiving peer 20 uploads an appliance control computer program to the connected service-providing peer using the service connection. Next, during task 112 the service-providing peer 20 executes the just-uploaded computer program. Task 112 causes the service-providing peer 20 to become specifically configured to provide a desirable user interface for the specific appliance being controlled. Next, during task 114 control data are received at the service-receiving peer 20 over the service connection. The control data originated from user input supplied through the control computer program being executed on the service-providing peer 20. After task 114, task 116 controls the subject appliance in accordance with the control data received in task 114. After task 116, program flow returns.

Figure 11:
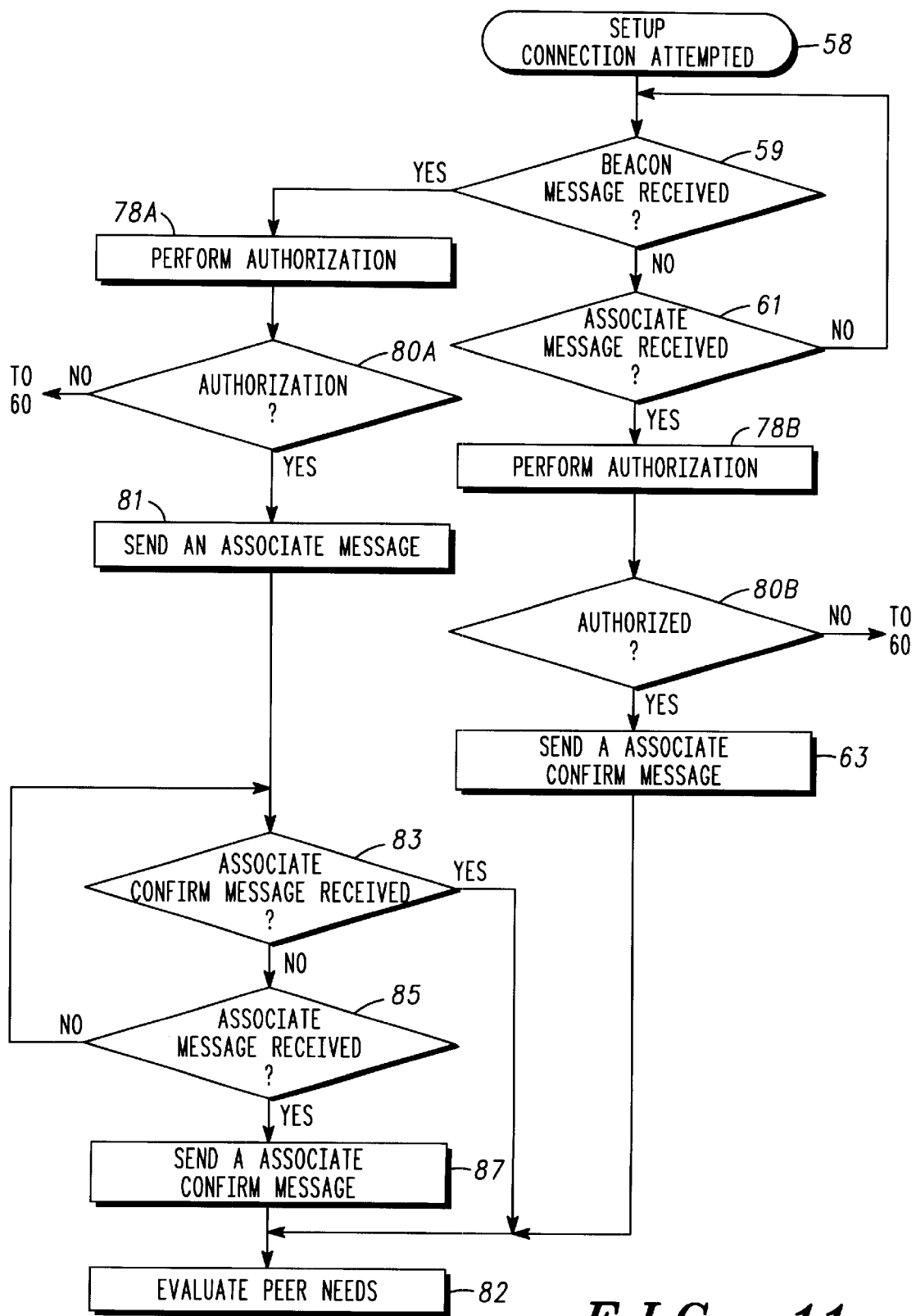
FIG. 11 shows a flow chart of tasks included in a capability addressable connection process for initiating communications between peers.

FIG. 11 is a flow chart providing further detail of the capability addressable coupling process as shown in FIG. 6. FIG. 11 illustrates a method of initiating a communication link between first and second electronic devices or first and second peers 20. Referring briefly to FIGS. 1, 2, and 6, task 58 causes transmit and receive section 38 to monitor wireless communication link 26 to determine whether a signal compatible with a protocol being used by network 22 can be received. In particular, task 58 of FIG. 11 indicates that a setup connection or coupling process in transmitting a beacon message from a first peer 20 is received by a second peer 20. The beacon message transmitted by the first peer 20 is an unsolicited message that is broadcast to any listening electronic device. The type of information transmitted in the beacon message is not a limitation of the present invention. In other words, the beacon message may or may not include all of the elements in need/capability message 64 as illustrated in FIG. 7. By way of example, the beacon message could only include the peer ID 66 portion of need/capability message 64 in order to save bandwidth and power when transmitting data. Thus, the first peer 20 transmits a beacon message, i.e., the identity of the first peer 20 as contained in peer ID 66, as an unsolicited periodic message independent of whether any other electronic device is within a close enough proximity to receive the message.

Task 78A of FIG. 11 causes second peer 20 to perform an authorization of the identity message received from the first peer 20. If authorized to establish a communications link as determined by task 80A, second peer 20 sends or transmits an associate message as indicated by task 81 to first peer 20. Thus, second peer 20 acknowledges receipt of the identity of first peer 20 based on authorization of the second peer 20 to communicate with the first peer 20 by transmitting an associate message from second peer 20. If not authorized to establish a communications link, no associate message is transmitted and second peer 20 returns from task 80A (see FIG. 11) to task 60 (see FIG. 6).

The associate message sent by the second peer 20 to the first peer 20 confirms that second peer 20 is authorized to communicate with first peer 20 based on the transmitted identity of the first electronic device. First peer 20 receives the associate message and moves from task 61 to task 78B. Task 78B (also see task 78 in FIG. 6) causes first peer 20 to determine whether authorization is granted for the first peer 20 to establish communications with the second peer 20. If authorization is granted then the first peer 20 moves from task 80B to task 63 (FIG. 11). Task 63 causes first peer 20 to send or transmit an associate confirm message to second peer 20. Thus, first peer 20 acknowledges both a receipt of the associate message from second peer 20 and a granted authorization of first peer 20 to communicate with second peer 20 by transmitting an associate confirm message. When second peer 20 receives the associate confirm message in task 83, the two-way communications link between first peer 20 and second peer 20 is established.

At this point, a communication link has been initiated and established between the first and second electronic devices and they are ready to communicate additional information between themselves. Task 82 in FIG. 11 corresponds with task 82 in FIG. 6, which causes an exchange of needs and capabilities between first peer 20 and second peer 20. The first peer 20 transmits its needs and capabilities to the second peer 20 and the second peer 20 transmits its needs and capabilities to the first peer 20. A need of peer 20 is defined as a need for service. It may be that the need for service is an operation that is desired to be performed on the data of peer 20 but peer 20 is not capable of performing the desired operation. For example, it may be desired that the data be displayed but peer 20 does not have a display for viewing the data. A capability of peer 20 is defined as a capability to perform a service. It may be that the capability for service includes an operation that peer 20 is capable of performing. For example, it may be desired that the data in peer 20 be encrypted for security reasons and peer 20 has an encryption circuit. The peer 20 with the encryption circuit has a capability of encrypting data that can be offered as an operation to other peers without the encryption circuit.

Figure 12:
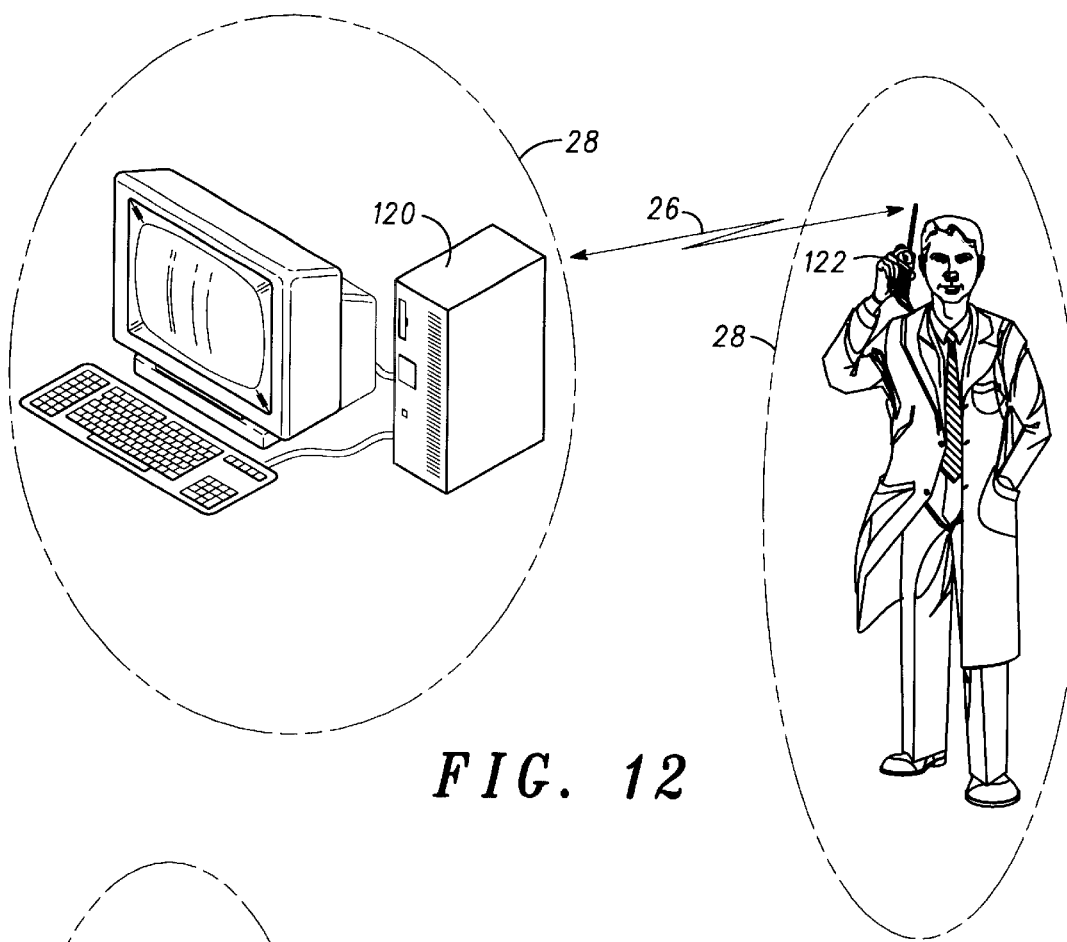
FIG. 12 illustrates a first example whereby the capability addressable connection process establishes communications between a computer and a personal presence identifier.

FIG. 12 illustrates a first example whereby the capability addressable connection process establishes communications between two peers 20, i.e., a computer 120 and a personal presence identifier 122. Personal presence identifier 122 is a specific peer 20 such as an electronic watch, an electronic wallet, a bracelet, a portable cellular phone, or a pager that has the capability of establishing a communications protocol with another peer 20, i.e., computer 120. When computer 120 and personal presence identifier 122 reside within each others detection zone 28, they are interlinked via, for example, RF interconnections, represented as wireless communication links 26.

To initiate the establishment of the personal area network, computer 120 and personal presence identifier 122 each execute query task 58 of process 56 (FIG. 6). Task 58 determines that computer 120 and personal presence identifier 122 have transmitted an unsolicited and periodic beacon message in attempting to setup a connection and are residing within each others detection zone 28. Task 58 causes transmit and receive section 38 (FIG. 2) to monitor wireless communication link 26 to determine whether a signal compatible with a protocol being used by communications network 22 (FIG. 1) is received. Through a self-initiated process computer 120 and personal presence identifier 122 transmit associate messages and associate confirm messages in establishing a personal area network (see tasks described in FIG. 11).

Once the personal area network is established and computer 120 and personal presence identifier 122 are authorized to communicate with each other, needs specification 70 and capability specification 72 of need/capability message 64 (FIG. 7) are exchanged. In other words, computer 120 transmits needs specification 70 and capability specification 72 as the portion of need/capability message 64 of FIG. 7 to personal presence identifier 122. Need table 74 (FIG. 8) contains examples of items in needs specification 70 and capability table 76 (FIG. 9) contains examples of items in capability specification 72 for computer 120. On the other hand, personal presence identifier 122 transmits needs specification 70 and capability specification 72 as the portion of need/capability message 64 of FIG. 7 to computer 120. Need table 74 (FIG. 8) contains examples of items in needs specification 70 and capability table 76 (FIG. 9) contains examples of items in capability specification 72 for personal presence identifier 122.

By way of example, a need of computer 120 is a service that computer 120 needs performed. The service may include a function that computer 120 is not capable of performing or authorized to perform, such as providing a password that enables or allows a user access to files, data, and programs stored on computer 120. Thus, personal presence identifier 122 establishes communications network 22 (FIG. 1) with computer 120 and in addition, provides authorization that instructs computer 120 to have an active keyboard and screen and provide access to user's computer files. Further, a capability of personal presence identifier 122 is a service or function that personal presence identifier 122 is capable of performing. By way of example, personal presence identifier 122 stores information on the user's computer home directories, font styles, files, etc., which is transferred from personal presence identifier 122 to computer 120 without user intervention. Tasks 104, 106 and 108 of process 102 (FIG. 10) are performed to program computer 120 with personalization data 52 (FIG. 2) from personal presence identifier 122. During task 104, computer 120 gets personalization data 52 from the service connection with personal presence identifier 122. Next, task 106 translates the network compatible personalization data 52 into a format appropriate for computer 120. As a result, computer 120 is programmed with a particular user's personalization data whenever that user is in close proximity to computer 120 and authorized to use computer 120, without requiring action on the user's part, and regardless of prior persons who may have used computer 120.

By providing access to computer 120 when personal presence identifier 122 is in close proximity allows computer security without the typing of a password on computer 120. Thus, wireless communication link 26 is automatically established when an authorized user with the personal presence identifier 122 is within detection zone 28 of computer 120. Further, as long as computer 120 and personal presence identifier 122 remain in close proximity, computer 120 remains active to the user identified by personal presence identifier 122. However, computer security is further enhanced because wireless communication link 26 between personal presence identifier 122 and computer 120 is broken when personal presence identifier 122 is removed from the close proximity with computer 120. Wireless communication link 26 is immediately broken when the user with the personal presence identifier 122 leaves detection zone 28 of computer 120.

Figure 13:
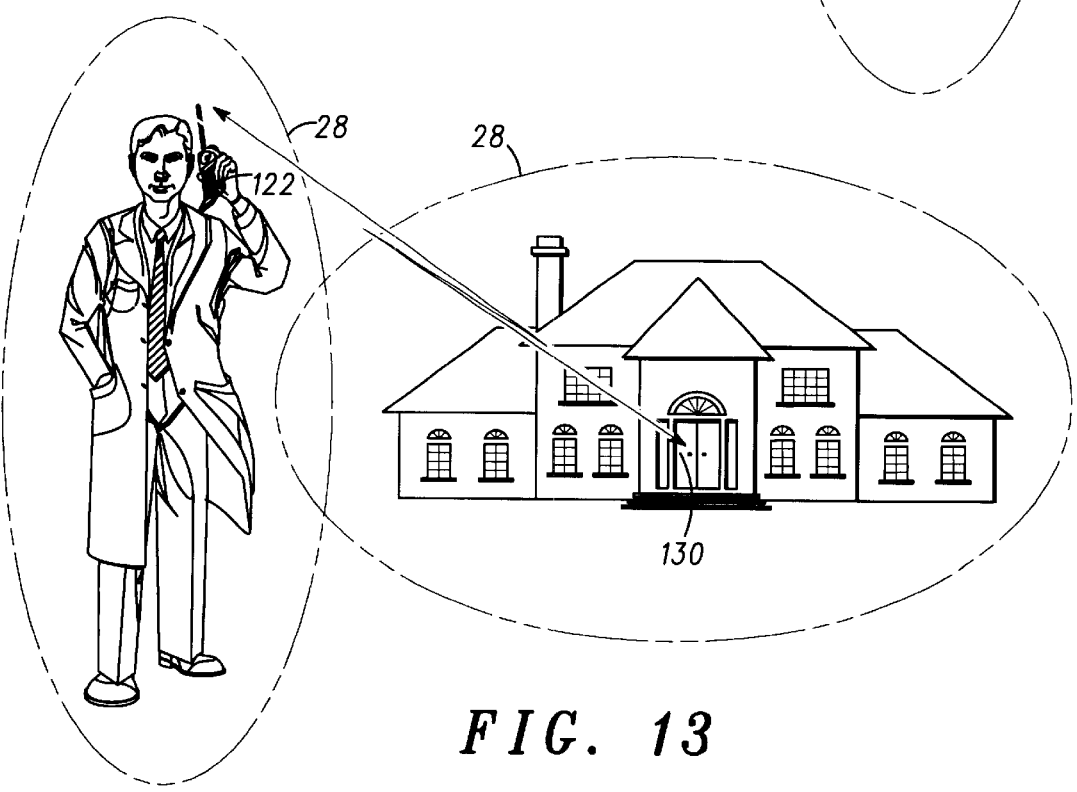
FIG. 13 illustrates a second example whereby the capability addressable connection process establishes communications between a doorbell and the personal presence identifier.

FIG. 13 illustrates a second example whereby the capability addressable connection process establishes communications between two peers 20, i.e., a door entry system 130 and a personal presence identifier 122. Door entry system 130 is an electronic device such as a doorbell system that has the communications protocol of peer 20. By way of example, door entry system 130 is externally mounted at the front entry of a residence. When door entry system 130 and personal presence identifier 122 reside within each others detection zone 28, they are interlinked via, for example, RF interconnections, represented as wireless communication link 26. For instance, a handicapped person or safety conscience person wearing personal presence identifier 122 can establish the personal area network without having to physically push the doorbell.

To initiate the establishment of the personal area network, door entry system 130 and personal presence identifier 122 each execute query task 58 of process 56 (FIG. 6). Task 58 determines that door entry system 130 and personal presence identifier 122 are each attempting to setup a connection by transmitting unsolicited and periodic beacon messages and each resides within the others detection zone 28. Task 58 causes transmit and receive section 38 (FIG. 2) to monitor wireless communication link 26 to determine whether a signal compatible with a protocol being used by communications network 22 (FIG. 1) is received. Through a self-initiated process door entry system 130 and personal presence identifier 122 transmit associate messages and associate confirm messages in establishing a personal area network (see tasks described in FIG. 11).

Once the personal area network is established and door entry system 130 and personal presence identifier 122 are authorized to communicate with each other, needs specification 70 and capability specification 72 of need/capability message 64 (FIG. 7) are exchanged. Door entry system 130 and personal presence identifier 122 have several possible options when operating together. A first option is that door entry system 130 reads peer ID 66 (FIG. 7) of personal presence identifier 122 to determine the identity of the person wearing personal presence identifier 122. To enhance security of the residence, the identity of the person could then be displayed on a service-providing peer 20 within the residence which is capable of displaying information received from door entry system 130. Service-providing peer 20 would log the identity found in peer ID 66 (FIG. 7) of each person having a personal presence identifier 122 that attempts a setup connection via door entry system 130.

A second option involves receiving a note intended only for the person residing at the resident. For instance, a delivery service may want to leave a private message explaining possible options after finding no one at home. After establishing the identity of the delivery service personnel who is wearing personal presence identifier 122, door entry system 130 could receive a message entered though personal presence identifier 122 by the delivery service personnel. The message would then be displayed on a service-providing peer 20 within the residence which is capable of displaying information received from door entry system 130.

A third option involves the home owner leaving a message for the delivery service personnel that has a specific identification designator programmed in the personal presence identifier 122. For instance, the resident may want to leave a private message with the delivery service after establishing the identity of the person wearing personal presence identifier 122. By providing or receiving messages at a location near the entry of a residence, door entry system 130 enhances the security of the resident by allowing private messages to be communicated. A wireless communication link 26 is automatically established when a user with the personal presence identifier 122 is within detection zone 28 of door entry system 130. The identity of the user with the personal presence identifier 122 is available to the residence of the home serviced by door entry system 130.

Figure 14:
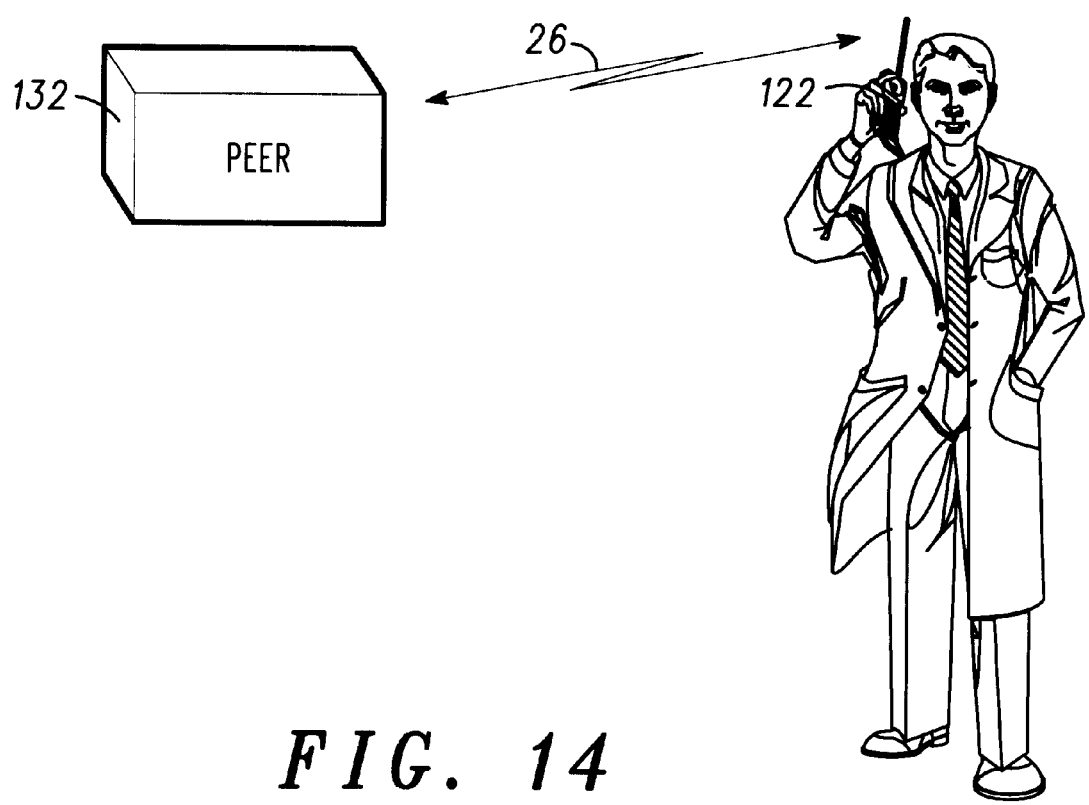
FIG. 14 is a diagram that illustrates a capability addressable connection between two peers.

FIG. 14 illustrates a third example of the capability addressable connection process that establishes communications between two peers 20, i.e., a peer 132 as a transaction system and personal presence identifier 122. Presently, merchandise protected by a magnetic strip is detected at a sensing point and activates an alarm when the magnetic strip is not removed after the merchandise was purchased. Alternatively, the present invention allows merchandise to be protected by a passive device having magnetic information or a unique Universal Product Code (UPC) barcode that can be deactivated without removing the passive device from the merchandise. The self-closing transaction system allows purchases to be made without intervention of the sales clerk which reduces merchandising cost and eliminates time waiting in lines to make the purchase.

To initiate the purchase transaction, the peer device 132 and personal presence identifier 122 each attempt to setup a connection by transmitting beacon messages. Associate messages and associate confirm messages are exchanged between the peer device 132 and personal presence identifier 122 to establish link 26 (see tasks described in FIG. 11) in response to the unsolicited and periodic beacon messages. The user of personal presence identifier 122 scans the magnetic code or barcode attached to the merchandise that is being purchased and also provides authorization for a financial transaction. Authorization in the form of public and private cryptographic keys provides security during the financial transaction during which funds are transferred from a banking institution to the merchant. The three-way transaction involving the banking institution, the merchant, and the user of personal presence identifier 122 is completed by notifying the merchant and personal presence identifier 122. Further, upon completion of the financial transaction the sensing point is programmed to allow the passive device attached to the purchased merchandise to pass the sensing point without activating the alarm.

Figure 15:
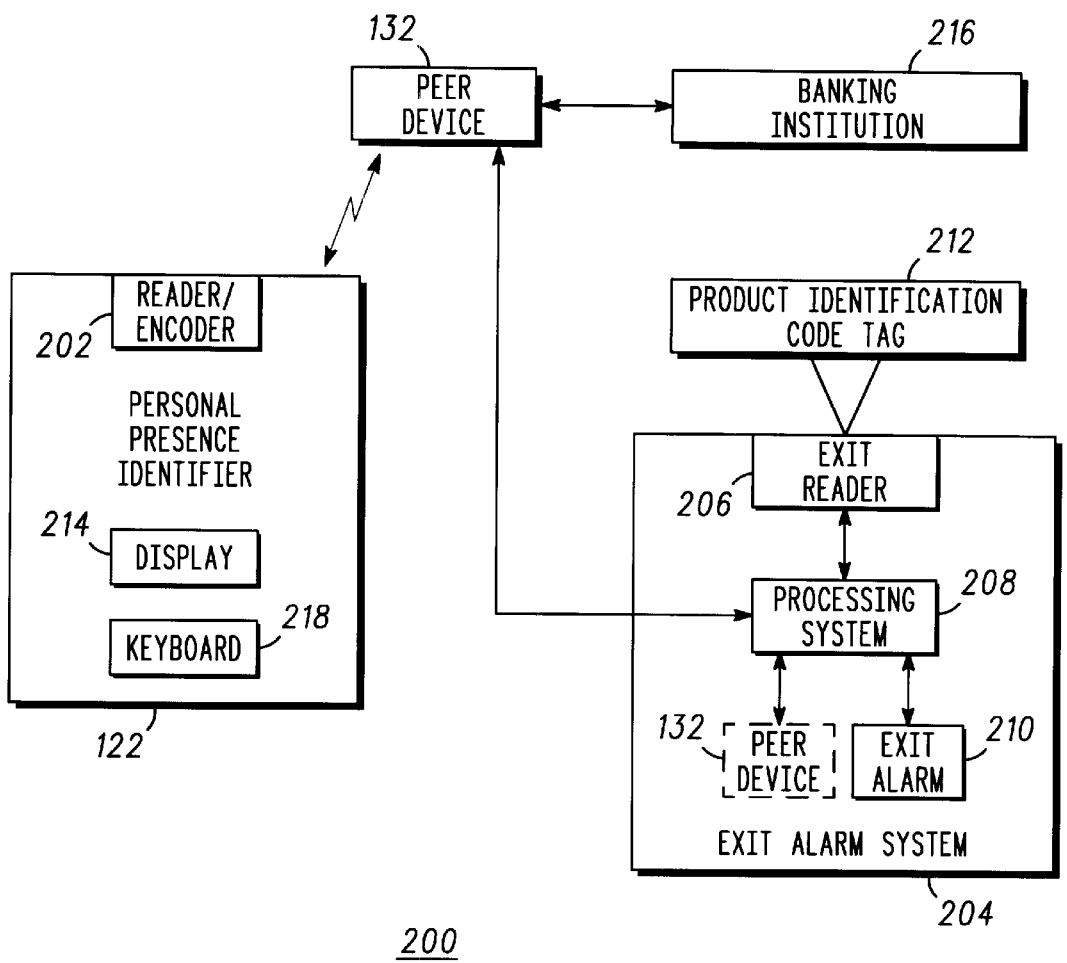
FIG. 15 is an electrical block diagram of a transaction system in accordance with the present invention.

In somewhat more detail, FIG. 15 depicts an electrical block diagram of a transaction system 200 in accordance with the present invention. The transaction system 200 comprises a first peer device 132, arranged and programmed for handling a transaction at a point of sale provided by a merchant, via proximity-based short-range wireless links. The transaction system 200 preferably further comprises an exit alarm system 204 coupled to the first peer device 132 for receiving a confirmation identifying an article of merchandise which has been purchased by the user carrying a personal presence identifier 122. The exit alarm system 204 comprises a conventional processing system 208 for processing and storing the confirmation. The exit alarm system 204 further comprises a conventional exit reader 206, such as a magnetic stripe reader, coupled to the processing system 208 for reading a conventional product identification code tag 212 on the article of merchandise as it exits the point of sale. The exit alarm system 204 also includes a conventional exit alarm 210 coupled to the processing system 208 for generating an alarm when the article of merchandise exits the point of sale and the confirmation corresponding to the article of merchandise has not been received from the first peer device 132. It will be appreciated that, alternatively, the exit alarm system 204 can include a second peer device 132 for communicating directly with the personal presence identifier 122, instead of via the first peer device 132.

The transaction system 200 further comprises at least one personal presence identifier 122 carried by a user for interacting with the transaction system 200. The personal presence identifier 122 preferably includes a conventional reader/encoder 202, such as a magnetic stripe reader/encoder, for reading a product identification code from the product identification code tag 212 on an article of merchandise. In a first embodiment, the reader/encoder 202 is also used to encode a cryptographic key onto the product identification code tag 212 after purchasing the associated article of merchandise, as explained further below. In addition, the personal presence identifier 122 preferably includes a conventional display 214, such as a liquid crystal display for displaying information to the user, and a conventional keyboard 218 for control of the personal presence identifier 122 by the user.

Detailed operation of the transaction system 200 will now be described. A user carrying the personal presence identifier 122 enters the merchant's point of sale, e.g., the merchant's store. When the personal presence identifier 122 comes within transmission range, e.g., 10 meters, of the first peer device 132, the first peer device 132 and the personal presence identifier 122 establish a two-way personal area network with one another. The first peer device 132 and the personal presence identifier 122 then exchange needs specifications and capability specifications with one another in accordance with the present invention after establishing the two-way personal area network. When the user locates an article of merchandise of interest, the user controls reader/encoder 202 of the personal presence identifier 122 to scan the product identification code from the product identification code tag 212 and to cooperate with the first peer device 132 to determine the purchase price of the article of merchandise. The personal presence identifier 122 then preferably displays the purchase price on the display 214.

If the user decides to purchase the article, the user enters a key sequence on the keyboard 218 to initiate a purchase transaction. In response, the first peer device 132 sends a bank request to the banking institution 216, for the purchase price. In response, the banking institution 216 transfers money from the purchaser's account to the merchant's account through well-known techniques, and acknowledges the transfer to the first peer device 132. It will be appreciated that the term "banking institution" can include multiple banks, financial clearing houses, and the like.

The merchant's systems, which can include a conventional server (not shown), then generate a shared cryptographic key, using a well-known technique, e.g., Shamir's technique. The cryptographic key is uniquely assigned to the financial transaction and the article of merchandise. A first cryptographic key, and the product identification code are sent from the first peer device 132 to the exit alarm system 204, along with encrypted transaction information. Having the product identification code, the encrypted transaction information, and the first cryptographic key, the exit alarm system 204 can build a database corresponding to valid financial transactions and product identification codes.

A second cryptographic key is sent from the first peer device 132 to the personal presence identifier 122, along with an acknowledgment receipt for the transaction, and the product identification code. In the first embodiment, the purchaser then encodes the product identification code tag 212 with the second cryptographic key. When the purchaser reaches the exit of the point of sale, the exit alarm system 204 scans the product identification code tag 212 for the product identification code and the second cryptographic key. Using the product identification code for accessing the database of purchased products, the exit alarm system 204 can locate and access the first cryptographic key. Having both halves of the cryptographic key, the exit alarm system 204 can decrypt the financial transaction information related to the product. During decryption, the exit alarm system 204 needs to verify an integrity-check value held within the financial transaction information. If improper pieces are used as the cryptographic key, the verification of the integrity-check value will not succeed. Without successful decryption, the exit alarm 210 is triggered. With successful decryption, the exit alarm 210 is not triggered, and the exit alarm system 204 can process other codes related to other products leaving the store.

In a second embodiment in accordance with the present invention, the exit alarm system 204 further comprises the second peer device 132. Also, in the second embodiment the purchaser does not encode the product identification code tag 212 with the second cryptographic key. Instead, the personal presence identifier 122 retains the second cryptographic key in a database cross-referenced to the product identification code. When the user reaches the exit alarm system 204, the personal presence identifier 122 establishes a two-way personal area network with the second peer device 132. Then, as the product identification code tags are scanned by the exit alarm system 204, the second cryptographic key corresponding to each product identification code scanned is communicated wirelessly from the personal presence identifier 122 to the exit alarm system 204.

In a third embodiment in accordance with the present invention, the personal presence identifier 122 and the peer device 132 are arranged and programmed to allow the user to accumulate a plurality of articles of merchandise to be purchased, and to then pay for the plurality of articles of merchandise through a single payment transaction. This embodiment advantageously minimizes the number of financial transactions required.

In a fourth embodiment in accordance with the present invention, the personal presence identifier 122 and the peer device 132 are arranged and programmed to handle a plurality of purchases from a plurality of users carrying a plurality of personal presence identifiers 122, and to sort the plurality of purchases by means of a unique identification code pre-programmed into each of the plurality of personal presence identifiers 122. This embodiment is advantageous in large stores in which it is likely that several purchasers may purchase the same product(s) before arriving at the exit alarm system 204.

By now it should be appreciated that the present invention provides a transaction system using proximity-based short-range wireless links. The transaction system advantageously allows users to select and pay for articles of merchandise without assistance from store personnel. A dual cryptographic key technique in cooperation with an exit alarm system provides a secure check-out.

Many modifications and variations of the present invention are possible in light of the above teachings. Thus, it is to be understood that, within the scope of the appended claims, the invention can be practiced other than as specifically described herein above.

What is claimed is:

1. A transaction system using proximity-based short-range wireless links, the transaction system comprising:
   a peer device arranged and programmed for handling a transaction at a point of sale provided by a merchant; and
   a personal presence identifier carried by a user and coupled to the peer device by a short-range two-way wireless link,
   wherein the peer device and the personal presence identifier are arranged and programmed to establish a two-way personal area network with one another when the personal presence identifier is within wireless transmission range of the peer device, and
   wherein the personal presence identifier and the peer device are also arranged and programmed to exchange needs specifications and capability specifications with one another after establishing the two-way personal area network, each needs specification is a list of network needs currently experienced by a broadcasting entity and each capability specification is a list of network capabilities that the broadcasting entity may provide to other peers of the network.

2. The transaction system of claim 1, wherein the personal presence identifier comprises a reader for reading a product identification code on an article of merchandise.

3. The transaction system of claim 1, wherein the personal presence identifier is arranged and programmed to:
   scan a product identification code on an article of merchandise;
   indicate a purchase price of the article of merchandise; and
   cooperate with the peer device to authorize payment of the purchase price in response to an action by the user of the personal presence identifier.

4. The transaction system of claim 1, wherein the peer device is arranged and programmed to:

accept a payment authorization from the personal presence identifier identifying an article of merchandise and a purchase price; and cooperate with a banking institution to transfer an amount equal to the purchase price from a first account belonging to the user to a second account belonging to the merchant.

5. The transaction system of claim 1, further comprising:

an exit alarm system coupled to the peer device for receiving a confirmation identifying an article of merchandise which has been purchased by the user of the personal presence identifier, the exit alarm system comprising:

a processing system for processing and storing the confirmation;

an exit reader coupled to the processing system for reading a product identification code on the article of merchandise as it exits the point of sale; and an exit alarm coupled to the processing system for generating an alarm when the article of merchandise exits the point of sale and the confirmation corresponding to the article of merchandise has not been received from the peer device.

6. The transaction system of claim 1, wherein the personal presence identifier comprises an encoder for encoding information onto a product identification tag attached to an article of merchandise, and wherein the personal presence identifier and the peer device are further arranged and programmed, after receiving payment for the article of merchandise, to:

send a first cryptographic key and a product identification code from the peer device to an exit alarm system;

send a second cryptographic key from the peer device to the personal presence identifier;

encode the second cryptographic key onto the product identification tag; and wherein the exit alarm system is arranged and programmed to allow the article of merchandise to pass the exit alarm system without generating an alarm, when the first and second cryptographic keys properly decrypt an integrity-check value.

7. The transaction system of claim 1, wherein the personal presence identifier and the peer device are further arranged and programmed to allow the user to:

accumulate a plurality of articles of merchandise to be purchased; and pay for the plurality of articles of merchandise through a single payment transaction.

8. The transaction system of claim 1, wherein the personal presence identifier and the peer device are further arranged and programmed to:

handle a plurality of purchases from a plurality of users carrying a plurality of personal presence identifiers; and sort the plurality of purchases by means of a unique identification code pre-programmed into each of the plurality of personal presence identifiers.

9. A method for facilitating a transaction at a point of sale provided by a merchant in a transaction system using proximity-based short-range wireless links, the transaction system including a peer device and a personal presence identifier carried by a user and coupled to the peer device by a short-range two-way wireless link, the method comprising the steps of:

establishing a two-way personal area network between the personal presence identifier and the peer device when the personal presence identifier is within wireless transmission range of the peer device, and exchanging needs specifications and capability specifications between the personal presence identifier and the peer device after establishing the two-way personal area network, each needs specification is a list of network needs currently experienced by a broadcasting entity and each capability specification including is a list of network capabilities that the broadcasting entity may provide to other peers of the network.

10. The method of claim 9, wherein the personal presence identifier includes a reader, and wherein the method further comprises the step of reading a product identification code on an article of merchandise.

11. The method of claim 9, further comprising in the personal presence identifier the steps of:

scanning a product identification code on an article of merchandise;

indicating a purchase price of the article of merchandise; and cooperating with the peer device to authorize payment of the purchase price in response to an action by the user of the personal presence identifier.

12. The method of claim 9, further comprising in the peer device the steps of:

accepting a payment authorization from the personal presence identifier identifying an article of merchandise and a purchase price; and cooperating with a banking institution to transfer an amount equal to the purchase price from a first account belonging to the user to a second account belonging to the merchant.

13. The method of claim 9, wherein the transaction system further comprises an exit alarm system coupled to the peer device, and wherein the method comprises in the exit alarm system the steps of:

receiving a confirmation identifying an article of merchandise which has been purchased by the user of the personal presence identifier;

processing and storing the authorization;

reading a product identification code on the article of merchandise as it exits the point of sale; and generating an alarm when the article of merchandise exits the point of sale and the confirmation corresponding to the article of merchandise has not been received from the peer device.

14. The method of claim 9, wherein the personal presence identifier includes an encoder for encoding information onto a product identification tag attached to an article of merchandise, and wherein, after receiving payment for the article of merchandise, the method comprises the steps of:

sending a first cryptographic key and a product identification code from the peer device to an exit alarm system;

sending a second cryptographic key from the peer device to the personal presence identifier;

encoding the second encryption key onto the product identification tag, and allowing, by the exit alarm system, the article of merchandise to pass the exit alarm system without generating an alarm, when the first and second cryptographic keys properly decrypt an integrity-check value.

15. The method of claim 9, further comprising the step of allowing the user to:

accumulate a plurality of articles of merchandise to be purchased; and pay for the plurality of articles of merchandise through a single payment transaction.

16. The method of claim 9, further comprising the steps of:

handling a plurality of purchases from a plurality of users carrying a plurality of personal presence identifiers; and sorting the plurality of purchases by means of a unique identification code pre-programmed into each of the plurality of personal presence identifiers.

17. The transaction system of claim 1, wherein the list of network needs of one of the personal presence identifier and the peer device is compared to the list of network capabilities of the other of the personal presence identifier and the peer device to determine whether there is at least one match between the lists.

18. A transaction system using proximity-based short-range wireless links, the transaction system comprising:

a peer device arranged and programmed for handling a transaction at a point of sale provided by a merchant; and a personal presence identifier carried by a user and coupled to the peer device by a short-range two-way wireless link, wherein the peer device and the personal presence identifier are arranged and programmed to establish a peer-to-peer communication network with one another when the personal presence identifier is within wireless transmission range of the peer device, and wherein the personal presence identifier and the peer device are also arranged and programmed to exchange needs specifications and capability specifications with one another after establishing the peer-to-peer communication network.

19. The transaction of claim 18, wherein the personal presence identifier is capable initiating a connection with the peer device, and the peer device is capable initiating a connection with the personal presence identifier.

* * * * *